(12) United States Patent
Jang et al.

(10) Patent No.: US 12,205,605 B2
(45) Date of Patent: Jan. 21, 2025

(54) AUDIO SIGNAL ENCODING AND DECODING METHOD USING A NEURAL NETWORK MODEL TO GENERATE A QUANTIZED LATENT VECTOR, AND ENCODER AND DECODER FOR PERFORMING THE SAME

(71) Applicants: ELECTRONICS AND TELECOMMUNICATIONS RESEARCH INSTITUTE, Daejeon (KR); INDUSTRY-ACADEMIC COOPERATION FOUNDATION, YONSEI UNIVERSITY, Seoul (KR)

(72) Inventors: Inseon Jang, Daejeon (KR); Seung Kwon Beack, Daejeon (KR); Jongmo Sung, Daejeon (KR); Tae Jin Lee, Daejeon (KR); Woo-Taek Lim, Sejong (KR); Hong-Goo Kang, Seoul (KR); Jihyun Lee, Seoul (KR); Chanwoo Lee, Seoul (KR); Hyungseob Lim, Seoul (KR)

(73) Assignees: ELECTRONICS AND TELECOMMUNICATIONS RESEARCH INSTITUTE, Daejeon (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 241 days.

(21) Appl. No.: 17/670,172

(22) Filed: Feb. 11, 2022

(65) Prior Publication Data
US 2022/0335963 A1 Oct. 20, 2022

(30) Foreign Application Priority Data
Apr. 15, 2021 (KR) .................. 10-2021-0049104

(51) Int. Cl.
*G10L 19/038* (2013.01)
*G10L 19/00* (2013.01)
*G10L 25/30* (2013.01)

(52) U.S. Cl.
CPC ............ *G10L 19/038* (2013.01); *G10L 25/30* (2013.01); *G10L 2019/0001* (2013.01)

(58) Field of Classification Search
CPC .................. G10L 19/038; G10L 25/30; G10L 2019/0001
See application file for complete search history.

(56) References Cited

U.S. PATENT DOCUMENTS 7,630,902 B2 * 12/2009 You ...................... G10L 19/025
704/229
10,068,557 B1 * 9/2018 Engel ..................... G06N 3/045
(Continued)

FOREIGN PATENT DOCUMENTS

KR  10-2020-0039530 A  4/2020

OTHER PUBLICATIONS

Chen, Mingjie, and Thomas Hain. "Unsupervised acoustic unit representation learning for voice conversion using wavenet auto-encoders." arXiv preprint arXiv:2008.06892 (2020) (Year: 2020).*
(Continued)

*Primary Examiner* — Bhavesh M Mehta
*Assistant Examiner* — Nandini Subramani

(57) ABSTRACT

An audio signal encoding and decoding method using a neural network model, and an encoder and decoder for performing the same are disclosed. A method of encoding an audio signal using a neural network model, the method may include identifying an input signal, generating a quantized latent vector by inputting the input signal into a neural network model encoding the input signal, and generating a bitstream corresponding to the quantized latent vector, wherein the neural network model may include i) a feature (Continued)

extraction layer generating a latent vector by extracting a feature of the input signal, ii) a plurality of downsampling blocks downsampling the latent vector, and iii) a plurality of quantization blocks performing quantization of a downsampled latent vector.

13 Claims, 7 Drawing Sheets

(56) References Cited

U.S. PATENT DOCUMENTS

| | | | |
|---|---|---|---|
| 10,665,247 B2* | 5/2020 | Vasilache | G10L 19/22 |
| 11,257,507 B2* | 2/2022 | Garbacea | G06N 3/08 |
| 2018/0249160 A1* | 8/2018 | Zhao | H04N 19/50 |
| 2019/0164052 A1 | 5/2019 | Sung et al. | |
| 2020/0135220 A1* | 4/2020 | Lee | G10L 19/032 |
| 2023/0267600 A1* | 8/2023 | Qu | G06T 7/001 |
| | | | 382/141 |
| 2023/0377584 A1* | 11/2023 | Pascual | G06N 3/0455 |

OTHER PUBLICATIONS

Zhen, Kai, et al. "Efficient and scalable neural residual waveform coding with collaborative quantization." ICASSP 2020-2020 IEEE International Conference on Acoustics, Speech and Signal Processing (ICASSP). IEEE, 2020. (Year: 2020).*

Fostiropoulos, Iordanis. "Depthwise Discrete Representation Learning." arXiv preprint arXiv:2004.05462 (Year: 2020).*

Wang, Xin, et al. "A Vector Quantized Variational Autoencoder (VQ-VAE) Autoregressive Neural F0 Model for Statistical Parametric Speech Synthesis," IEEE/ACM Transactions on Audio, Speech, and Language Processing 28, 2019.

Engel, Jesse, et al. "Neural audio synthesis of musical notes with wavenet autoencoders," International Conference on Machine Learning, PMLR, 2017.

Mingjie Chen et al., "Unsupervised Acoustic Unit Representation Learning for Voice Conversion using WaveNet Auto-encoders," Interspeech 2020, Aug. 16, 2020, arXiv preprint arXiv:2008.06892.

Siang Thye Hang et al.. "Bi-linearly weighted fractional max pooling: An extension to conventional max pooling for deep convolutional neural network." Multimedia Tools and Applications, May 31, 2017.

* cited by examiner

AUDIO SIGNAL ENCODING AND DECODING METHOD USING A NEURAL NETWORK MODEL TO GENERATE A QUANTIZED LATENT VECTOR, AND ENCODER AND DECODER FOR PERFORMING THE SAME

CROSS-REFERENCE TO RELATED APPLICATION

This application claims the benefit of Korean Patent Application No. 10-2021-0049104 filed on Apr. 15, 2021, in the Korean Intellectual Property Office, the entire disclosure of which is incorporated herein by reference for all purposes.

BACKGROUND

1. Field of the Invention

One or more example embodiments relate to an audio signal encoding and decoding method using a neural network model, and an encoder and decoder for performing the same.

2. Description of the Related Art

A technique of coding an audio signal has been continuously studied. For example, studies have been conducted to improve a compression efficiency in encoding an audio signal and improve a restoration quality in decoding an audio signal. Recently, as deep learning has been developing, new studies on an audio coding technique using deep learning have been conducted.

For example, a neural network model configured in an auto-encoder structure may include an encoding model for performing encoding of an audio signal and a decoding model for performing decoding of an audio signal. However, coding of an audio signal using a conventional neural network model may have a low compression efficiency and a low restoration quality when the signal is a high-frequency signal. Thus, there is a demand for a technique to reduce such problems.

SUMMARY

Example embodiments provide a method and apparatus for enhancing a compression efficiency and a restoration quality of an audio signal in encoding and decoding the audio signal by providing a neural network model using latent vectors having different resolutions.

According to an aspect, there is provided a method of encoding an audio signal using a neural network model, the method including identifying an input signal, generating a quantized latent vector by inputting the input signal into a neural network model encoding the input signal, and generating a bitstream corresponding to the quantized latent vector, wherein the neural network model may include i) a feature extraction layer generating a latent vector by extracting a feature of the input signal, ii) a plurality of downsampling blocks downsampling the latent vector, and iii) a plurality of quantization blocks performing quantization of a downsampled latent vector.

Each of the quantization blocks may quantize downsampled latent vectors downsampled to different time resolutions by the plurality of downsampling blocks.

Each of the quantization blocks may include a conversion layer converting the downsampled latent vector, and a vector quantization layer performing vector quantization on a converted latent vector converted in the conversion layer based on a codebook.

The vector quantization layer may perform vector quantization of the latent vector by determining a code in the codebook in a nearest distance from the converted latent vector.

The downsampling block may include a convolution layer performing a convolution operation and a maxpool layer processing a max-pooling operation on an operation result of the convolution layer.

The downsampling block may further include a residual block increasing non-linearity of the latent vector, and the residual block may include a convolution layer performing a convolution operation, a batch normalization layer performing batch normalization, and an activation layer.

According to an aspect, there is provided a method of decoding an audio signal using a neural network model, the method including identifying a bitstream generated by an encoder, and generating an output signal by inputting the bitstream into a neural network model generating an output signal from the bitstream, wherein the neural network model may include a plurality of inverse-quantization blocks extracting quantized latent vectors having different resolutions from the bitstream, a plurality of upsampling blocks upsampling inversely-quantized latent vectors, and a restoration layer generating an output signal from the upsampled latent vectors.

The plurality of upsampling blocks may upsample the latent vectors in an ascending order of time resolutions, and a current upsampling block of the plurality of upsampling blocks may upsample i) a latent vector, among the latent vectors, having a same resolution as an upsampled latent vector upsampled by a previous upsampling block and ii) a latent vector combined with the upsampled latent vector upsampled by the previous upsampling block.

The inverse-quantization block may include a residual block increasing non-linearity of the latent vector, and a convolution layer performing a convolution operation.

According to an aspect, there is provided an encoder for performing a method of encoding an audio signal using a neural network model, the encoder including a processor configured to identify an input signal, generate a quantized latent vector by inputting the input signal to a neural network model encoding the input signal, and generate a bitstream corresponding to the quantized latent vector, wherein the neural network model may include i) a feature extraction layer generating a latent vector by extracting a feature of the input signal, ii) a plurality of downsampling blocks downsampling the latent vector, and iii) a plurality of quantization blocks performing quantization of a downsampled latent vector.

Each of the quantization blocks may quantize downsampled latent vectors downsampled to different time resolutions by the plurality of downsampling blocks.

Each of the quantization blocks may include a conversion layer converting the downsampled latent vector, and a vector quantization layer performing vector quantization on a converted latent vector converted in the conversion layer based on a codebook.

The vector quantization layer may perform vector quantization of the latent vector by determining a code in the codebook in a nearest distance from the converted latent vector.

The downsampling block may include a convolution layer performing a convolution operation and a maxpool layer processing a max-pooling operation on an operation result of the convolution layer.

The downsampling block may further include a residual block increasing non-linearity of the latent vector, and the residual block may include a convolution layer performing a convolution operation, a batch normalization layer performing batch normalization, and an activation layer.

According to an aspect, there is provided a decoder for performing a method of decoding an audio signal using a neural network model, the decoder including a processor configured to identify a bitstream generated by an encoder, and generate an output signal by inputting the bitstream into a neural network model generating an output signal from the bitstream, wherein the neural network model may include a plurality of inverse-quantization blocks extracting quantized latent vectors having different resolutions from the bitstream, a plurality of upsampling blocks upsampling inversely-quantized latent vectors, and a restoration layer generating an output signal from the upsampled latent vectors.

The plurality of upsampling blocks may upsample the latent vectors in an ascending order of time resolutions, and a current upsampling block of the plurality of upsampling blocks may upsample i) a latent vector, among the latent vectors, having a same resolution as an upsampled latent vector upsampled by a previous upsampling block and ii) a latent vector combined with the upsampled latent vector upsampled by the previous upsampling block.

The inverse-quantization block may include a residual block increasing non-linearity of the latent vector, and a convolution layer performing a convolution operation.

Additional aspects of example embodiments will be set forth in part in the description which follows and, in part, will be apparent from the description, or may be learned by practice of the disclosure.

According to example embodiments, in encoding and decoding an audio signal, a compression efficiency and a restoration quality of an audio signal may be enhanced by providing a neural network model using latent vectors having different resolutions.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
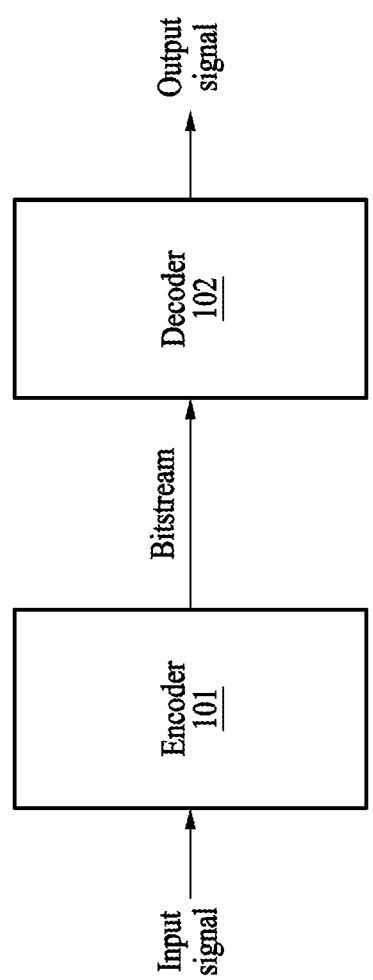
FIG. 1 illustrates an encoder and a decoder according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 illustrates an encoder and a decoder according to an example embodiment.

In encoding and decoding an audio signal, the present disclosure may improve a compression efficiency and restoration quality of an audio signal by providing a neural network model to perform vector quantization on latent vectors having different resolutions.

Referring to FIG. 1, an encoder 101 may receive an input signal and generate a bitstream. A decoder 102 may generate an output signal from the bitstream. The input signal may refer to an original audio signal to be encoded and decoded. The output signal may refer to a restored audio signal based on an encoded input signal.

The encoder 101 may include a processor. A processor included in the encoder 101 may perform an encoding method and a neural network model training method according to various examples of the present disclosure. The decoder 102 may include a processor. A processor included in the decoder 102 may perform a decoding method and a neural network model training method according to various examples of the present disclosure. For example, the encoder 101 and the decoder 102 may be the same electronic device.

A neural network model may be a deep learning-based learning model and may encode an input signal or generate an output signal from a bitstream. For example, the neural network model may be configured to have an autoencoder structure including an encoding model and a decoding model.

All operations performed by the neural network model may be performed by the processor included in the encoder 101 or the decoder 102. An encoding model of the neural network model may be performed by the encoder 101, and a decoding model of the neural network model may be performed by decoder 102.

The neural network model may include an input layer, a hidden layer, and an output layer. The input layer may be a layer to receive input data of the neural network model. For example, the neural network model may identify an input signal and may transmit the input signal to the hidden layer. The output layer may be a layer to provide output data of the neural network model. For example, the output layer may provide an output signal generated in the hidden layer.

The hidden layer may encode an input signal and may generate an output signal from the encoded input signal. The hidden layer may include a plurality of layers for processing an operation or a plurality of blocks including one or more of the layers. Each of the layers may include a plurality of weight nodes. A structure of the neural network model is described in detail with reference to FIGS. 2A and 2B.

The neural network model may be trained by a training method according to various examples of the present disclosure. For example, the encoder 101 or the decoder 102 may train the neural network model by updating weight nodes included in the neural network model based on a difference between an input signal and an output signal generated from the neural network model.

Figure 2A:
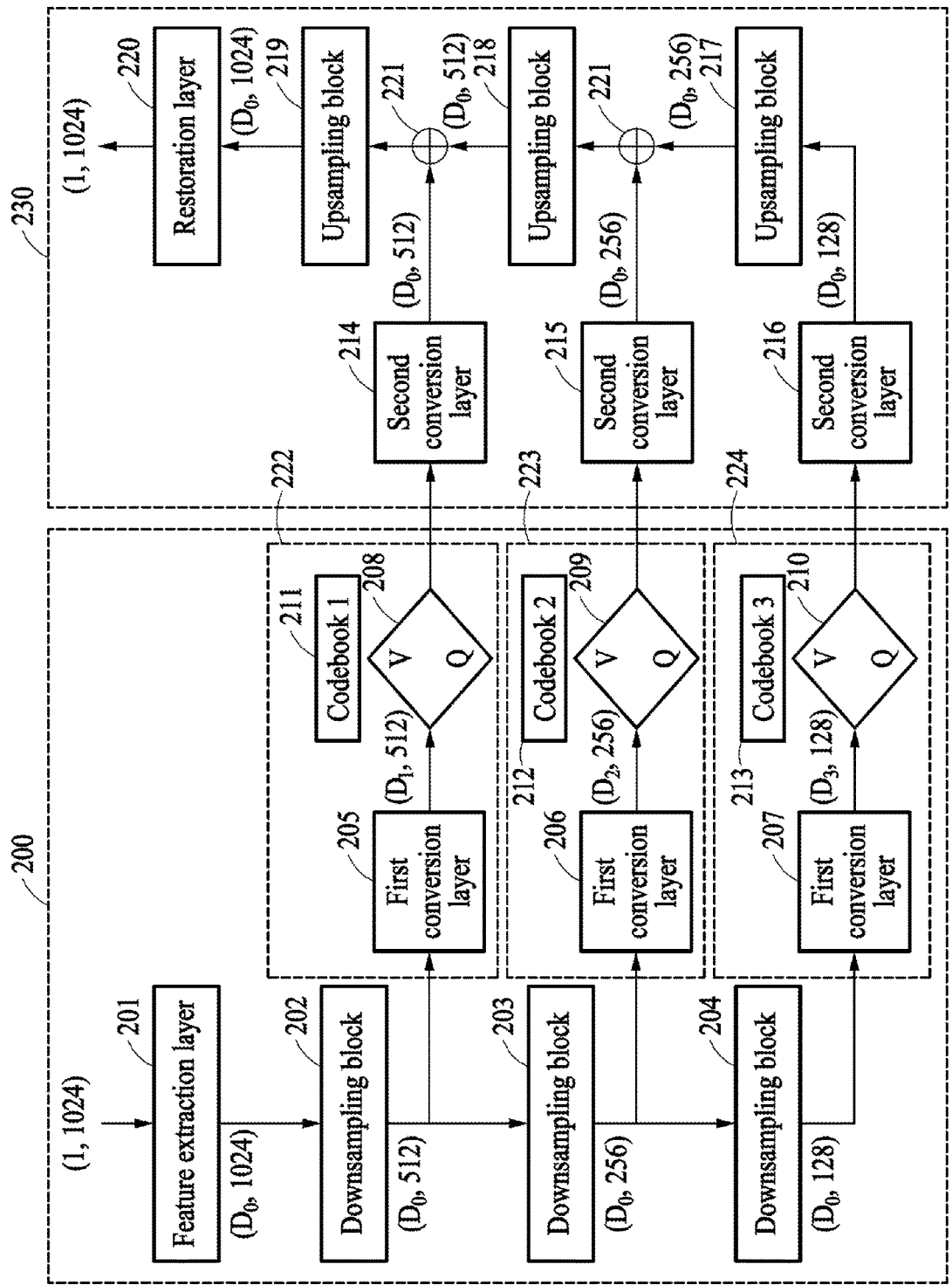
FIGS. 2A and 2B illustrate a structure of a neural network model according to an example embodiment.
Figure 2B:
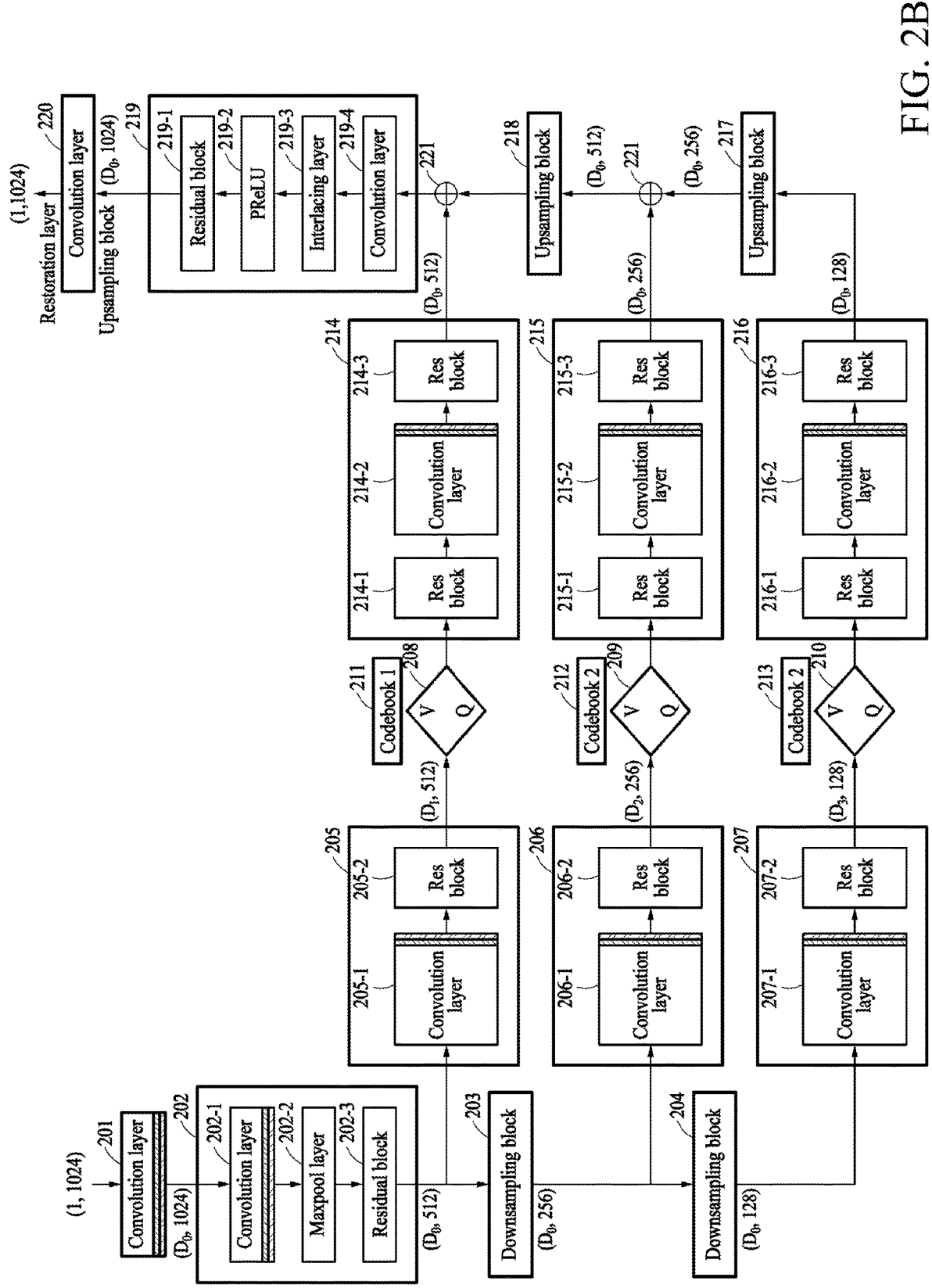

FIGS. 2A and 2B illustrate a structure of a neural network model according to an example embodiment.

FIG. 2A illustrates a structure of a neural network model used in the present disclosure. An encoder may generate quantized latent vectors by inputting an input signal to a neural network model encoding an input signal.

Referring to FIGS. 2A and 2B, the neural network model may include an encoding model 200 and a decoding model 230. The encoding model 200 may include a feature extraction layer 201, a plurality of downsampling blocks 202 to 204 and a plurality of quantization blocks 222 to 224.

The feature extraction layer 201 may generate a latent vector by extracting a feature of an input signal. The feature extraction layer 201 may increase a channel of the input signal. For example, an input signal (for example, (1, 1024) of FIGS. 2A and 2B) may be an audio signal configured in one channel and 1024 sample length of audio samples. The feature extraction layer 201 may output the latent vector as output data by receiving the input signal as input data.

For example, the feature extraction layer 201 may include a convolution layer performing a one-dimensional convolution operation. The input signal may be compressed or encoded as a latent vector in the feature extraction layer 201. A method of extracting a feature of an input signal is not limited to a convolution operation, and various methods other than the convolution operation may be used. Referring to FIGS. 2A and 2B, the latent vector generated in the feature extraction layer 201 may be a latent vector (for example, ($D_0$, 1024)) corresponding to $D_0$ channels and a 1024 sample length of audio samples.

In the feature extraction layer 201, since parameters used in the one-dimensional convolution operation may be updated in a process of training the neural network model, a higher compression rate may be achieved than is possible through a typical conversion method (for example, a linear prediction coding) by self-learning a rule of encoding an input signal to a latent vector.

Each of the downsampling blocks 202 to 204 may downsample the latent vector generated by feature extraction. For example, the downsampling blocks 202 to 204 may reduce a time resolution of the latent vector. For example, in the downsampling blocks 202 to 204, the time resolution of the latent vector may be reduced by one half.

Each of the downsampling blocks 202 to 204 may include a convolution layer for performing a convolution operation, a maxpool layer for processing a max-pooling operation on an operation result of the convolution layer, and a residual block for increasing non-linearity of a latent vector. In the maxpool layer, downsampling of the latent vector may be performed. A structure of the downsampling blocks 202 to 204 is described with reference to FIG. 2B.

The neural network model may generate latent vectors having different time resolutions through the plurality of downsampling blocks 202 to 204. A number of the downsampling blocks 202 to 204 is not limited to three as shown in FIG. 2A, and the number may vary based on examples.

For example, as shown in FIG. 2A, the downsampling blocks 202 to 204 may sequentially downsample a latent vector. That is, a current downsampling block of the downsampling blocks 202 to 204 may downsample a downsampled latent vector downsampled by a previous block of the downsampling blocks 202 to 204. Latent vectors output from the downsampling blocks 202 to 204 may have different time resolutions and each of the latent vectors may be respectively input to the quantization blocks 222 to 224. Since the quantization blocks 222 to 224 may have a one-to-one correspondence to the downsampling blocks 202 to 204, a number of the quantization blocks 222 to 224 may be identical to a number of the downsampling blocks 202 to 204.

By performing vector quantization on the latent vectors having different time resolutions, the present disclosure may improve a compression efficiency and a restoration quality in a high-frequency band.

The quantization blocks 222 to 224 may include first conversion layers 205 to 207 and vector quantization (VQ) layers 208 to 210. The first conversion layers 205 to 207 may be layers converting a latent vector for effective quantization. The first conversion layers 205 to 207 may be layers increasing non-linearity of the latent vector. A structure of the first conversion layers 205 to 207 is described with reference to FIG. 3. However, the first conversion layers 205 to 207 are not limited to the example of FIG. 3, and various examples that may increase non-linearity of a latent vector may be applied.

The vector quantization layers 208 to 210 may perform vector quantization on a converted latent vector converted in the first conversion layers 205 to 207 based on a codebook 211. The vector quantization layers 208 to 210 may compress the latent vector. The vector quantization layers 208 to 210 may perform vector quantization on the latent vector by determining a code in a nearest distance from the latent vector converted in the codebook 211.

Specifically, for a vector included in an axis corresponding to each channel of the latent vector, the vector quantization layers 208 to 210 may perform vector quantization by a method of determining a nearest-neighbor between vectors in the codebook 211. Since quantization of a latent vector is performed using vector quantization, training using backpropagation may be available.

For example, training using backpropagation may be performed based on an error function as shown below.

$$\text{Error} = \|sg(z_e) - e\|^2 + \gamma \|z_e - sg(e)\|^2 \quad \text{[Equation 1]}$$

In Equation 1, $\gamma$ may denote a proportional constant that represents contribution. Error may represent a vector quantization loss and may refer to a value of the error function. A code in the codebook 211 may be modified to minimize Error. $z_e$ may denote a latent vector that is a target of vector quantization. sg( ) may refer to a stop gradient operator. sg( ) may represent a value that does not change during a neural network optimization process since a differential value is not calculated in an error backpropagation process. e may denote any code of the codebook 211.

The encoder may generate a bitstream corresponding to latent vectors, having different time resolutions, generated by the quantization blocks 222 to 224. That is, the encoder may generate a bitstream corresponding to latent vectors (for example, ($D_1$, 512), ($D_2$, 256), ($D_3$, 128)) for an input signal having a constant length (for example, 1024-sample length audio samples). D of FIG. 2A may represent a channel of an input signal.

Parameters of the quantization block quantizing a latent vector and the feature extraction layer extracting a feature of an input signal may be updated through a process of training the neural network model.

The decoder may identify a bitstream generated by the encoder. The decoder may generate an output signal by inputting the bitstream to a neural network model generating an output signal from a bitstream. Specifically, the decoding model 230 of the neural network model may extract quantized latent vectors having different resolutions from the bitstream.

The decoding model 230 may include a plurality of inverse-quantization blocks 214 to 216 extracting latent vectors having different resolutions from a bitstream, a plurality of upsampling blocks 217 to 219 upsampling inversely-quantized latent vectors, and a restoration layer 220 generating an output signal from upsampled latent vectors.

The inverse-quantization blocks 214 to 216 may have a one-to-one correspondence to the quantization blocks 222 to 224. The inverse-quantization block 214 to 216 may include second conversion layers 214 to 216. The second conversion blocks 214 to 216 may convert quantized latent vectors to minimize distortion due to quantization. The second conversion layers 214 to 216 may inversely-quantize the quantized latent vectors to minimize distortion due to quantization.

The upsampling blocks 217 to 219 may sequentially perform upsampling on latent vectors in an ascending order of time resolutions. Referring to FIGS. 2A and 2B, a current upsampling block 217 to 219 of the upsampling blocks 217 to 219 may upsample i) a latent vector having a same time resolution as an upsampled latent vector upsampled by a previous upsampling block of the upsampling blocks 217 to 219 and ii) a latent vector combined with an upsampled latent vector upsampled by the previous upsampling block of the upsampling blocks 217 to 219.

A number of the upsampling blocks 217 to 219 may be identical to a number of the downsampling blocks 202 to 204. The upsampling blocks 217 to 219 may perform upsampling by increasing a time resolution of a latent vector. A detailed configuration of the upsampling blocks 217 to 219 is described with reference to FIG. 2B. For example, the upsampling block 217 may upsample a latent vector (for example, ($D_0$, 128)) that has the lowest time resolution.

In addition, the upsampling block 218 may upsample a combined latent vector which is a combination of an upsampled latent vector (for example, ($D_0$, 256) upsampled in the upsampling block 217 and a latent vector (for example, ($D_0$, 256)) generated by the inverse-quantization block 215.

For example, the upsampled latent vector upsampled in the upsampling block 217 and the latent vector generated by the inverse-quantization block 215 may be combined by a concatenation operation 221. Thus, a final upsampled latent vector may have an identical channel and identical time resolution as a latent vector generated in the feature extraction layer 201.

The restoration layer 220 may generate an output signal from the final upsampled latent vector. For example, referring to FIGS. 2A and 2B, the restoration layer 220 may generate an output signal (for example, (1, 1024) by restoring a latent vector (for example, ($D_0$, 1024)) generated from the upsampling block 219. For example, the restoration layer 220 may include a convolution layer performing a one-dimensional convolution operation. However, types of models used in each of the layers and blocks are not limited to the described examples.

Training the neural network model of FIG. 2A may be performed using a backpropagation technique using a loss function determined based on a difference between an input signal and an output signal generated from the neural network model. That is, the neural network model may be trained by updating weight nodes included in the neural network model to minimize a value of the loss function.

For example, the loss function may be determined based on a loss for vector quantization determined by Equation 1 and a loss on a difference between an input signal and an output signal generated from the neural network model.

For example, a mean square error may be used as the loss function. Alternatively, a loss function based on a psycho-acoustic model reflecting human auditory characteristics may be used. For example, the neural network model may be trained to minimize a sum of vector quantization losses in each of the quantization blocks and a loss (for example, a mean square error) on the difference between the input signal and the output signal generated from the neural network model.

The loss function is not limited to the described example, and various types of loss functions may be used.

FIG. 2B is a diagram illustrating a detailed configuration of downsampling blocks 202 to 204, quantization blocks 222 to 224, and upsampling blocks 217 to 219 of the neural network model of FIG. 2A.

For example, the feature extraction layer 201 may include a convolution layer performing a convolution operation, a batch normalization layer performing batch normalization, and an activation layer processing an operation with respect to an activation function. For example, a leaky rectified linear unit (leaky ReLU) may be used as the activation function.

Referring to FIG. 2B, in the feature extraction layer 201, batch normalization may be performed on a result on which a one-dimensional convolution operation is performed, and the activation function may be applied to a result on which batch normalization is performed.

The downsampling blocks 202 to 204 may include a convolution layer 202-1 performing a convolution operation, a maxpool layer 202-2 performing a max-pooling operation on a latent vector on which the convolution operation is performed, and a residual block 202-3. Through the max-pooling operation, a time resolution of a latent vector may be reduced. The convolution layer 202-1 may include a batch normalization layer performing batch normalization and an activation layer processing an operation with respect to an activation function.

Each of the first conversion layers 205 to 207 may increase a channel of a downsampled latent vector such that vector quantization may be processed. The first conversion layers 205 to 207 may include convolution layers 205-1, 206-1, 207-1 performing a convolution operation and residual blocks 205-2, 206-2, and 207-2 increasing non-linearity of a latent vector. A detailed configuration of the residual blocks 205-2, 206-2, and 207-2 is described with reference to FIG. 3.

The inverse-quantization blocks 214 to 216 may include second conversion layers 214 to 216. Each of the second conversion layers 214 to 216 may reduce channels increased in the corresponding first conversion layers 205 to 207. The second conversion layers 214 to 216 may sequentially include residual blocks 214-1, 215-,1, and 216-1, convolution layers 214-2, 215-2, and 216-2, and residual blocks 214-3, 215-3, and 216-3.

The upsampling blocks 217 to 219 may include a convolution layer 219-4 performing a convolution operation, an interlacing layer 219-3 performing an interlacing operation on a latent vector on which the convolution operation is performed, an activation layer 219-2 performing an operation with respect to an activation function (for example, a parametric ReLU), and a residual block 219-1.

A latent vector input to the upsampling blocks 217 to 219 may be processed in an order of the convolution layer 219-4, the interlacing layer 219-3, the activation layer 219-2, and the residual block 219-1. Types of models used in each of the layers and blocks are not limited to the described examples.

Figure 3:
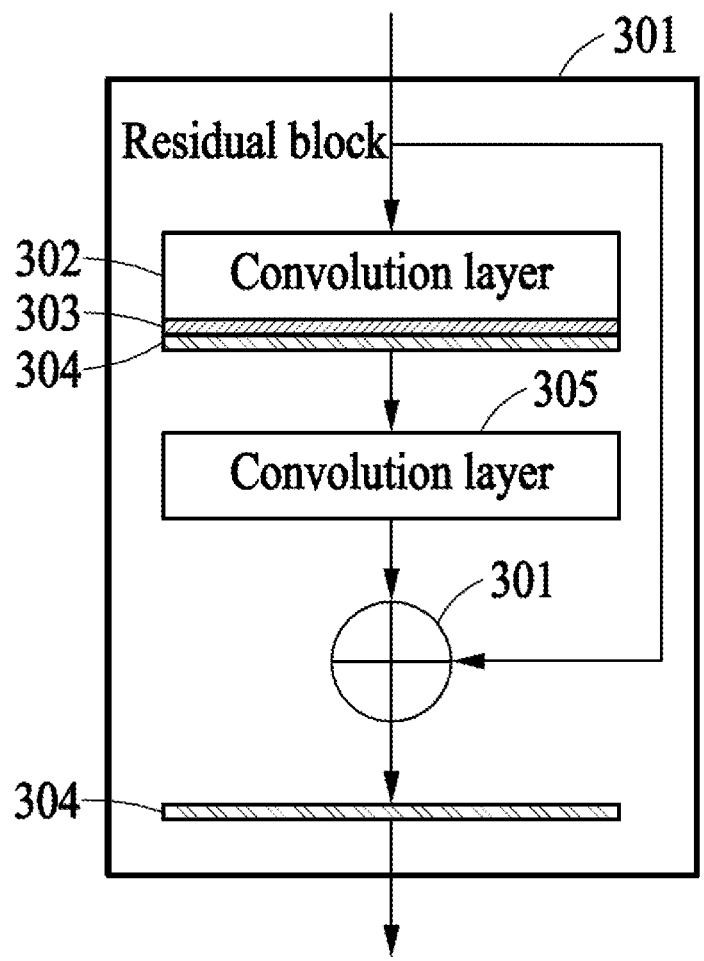
FIG. 3 illustrates a structure of a residual block according to an example embodiment.

FIG. 3 illustrates a structure of a residual block according to an example embodiment.

A residual block 301 may include a convolution layer 302, a batch normalization layer 303, an activation layer 304, and a convolution layer 305. For example, the residual block 301 may process operations through the convolution layer 302, the batch normalization layer 303, and the activation layer 304 on input data. For example, the residual block may be implemented by modifying a configuration of a one-dimensional convolution.

The residual block 301 may generate final output data of the residual block 301 by inputting a result obtained by inputting data combined with a processed result input to the convolution layer 305 to the batch normalization layer 304. The input data and the result obtained by inputting a processed result processed by the convolution layer 302, the batch normalization layer 303, and the activation layer 304 to the convolution layer 305 may be combined by a concatenation operation 301.

Figure 4:
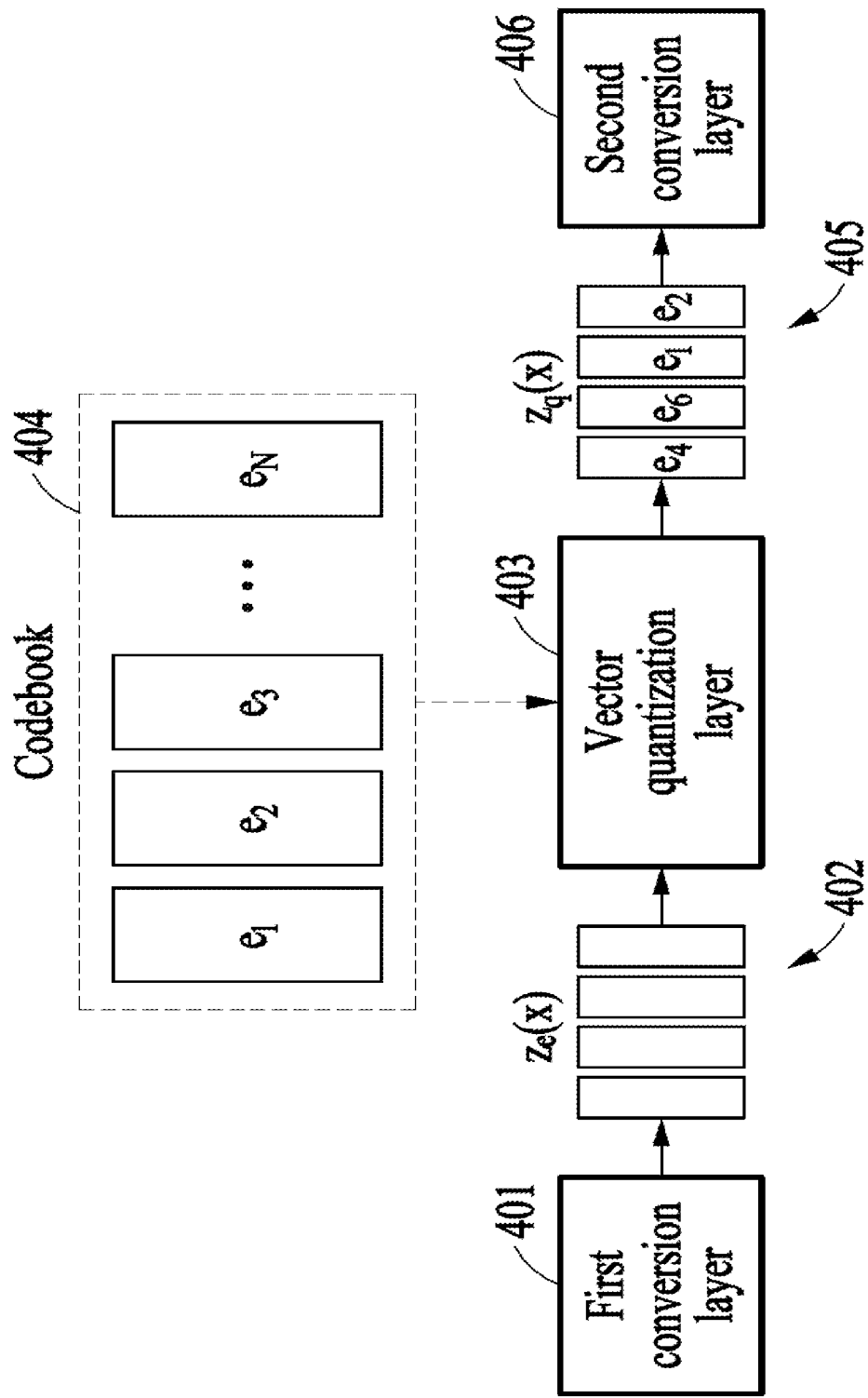
FIG. 4 is a block diagram illustrating a quantization process according to an example embodiment.

FIG. 4 is a block diagram illustrating a quantization process according to an example embodiment.

In a first conversion layer 401, a converted latent vector $z_e(x)$ may be quantized in a vector quantization layer 403. The vector quantization layer 403 may perform quantization of a latent vector by determining one of codes $e_1$ to $e_N$ included in a codebook 404 in a nearest distance between vectors of each axis of a latent vector $z_e(x)$.

The vector quantization layer 403 may determine a code in a nearest distance between vectors using a nearest neighbor (NN) algorithm. A quantized latent vector $z_q(x)$ may be converted in a second conversion layer 406. In the second conversion layer 406, a channel of the quantized latent vector $z_q(x)$ may be reduced.

Figure 5:
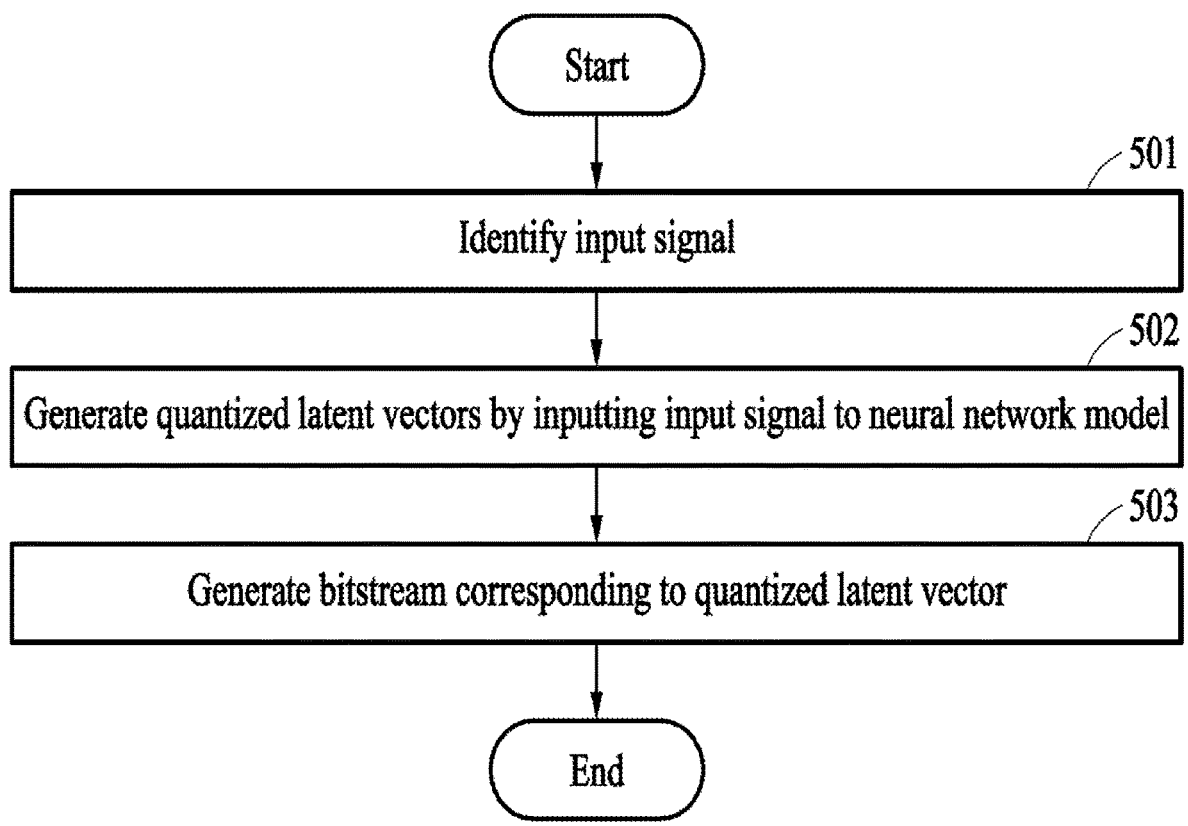
FIG. 5 is a flowchart illustrating an encoding method according to an example embodiment.

FIG. 5 is a flowchart illustrating an encoding method according to an example embodiment.

In operation 501, an encoder may identify an input signal. In operation 502, the encoder may generate quantized latent vectors by inputting the input signal to a neural network model encoding the input signal. In operation 503, the encoder may generate a bitstream corresponding to the quantized latent vector.

The neural network model may be a neural network model that is trained to encode an input signal. The neural network model may include i) a feature extraction layer generating a latent vector by extracting a feature of an input signal, ii) a plurality of downsampling blocks downsampling the latent vector, and iii) a plurality of quantization blocks performing quantization of the downsampled latent vector.

Figure 6:
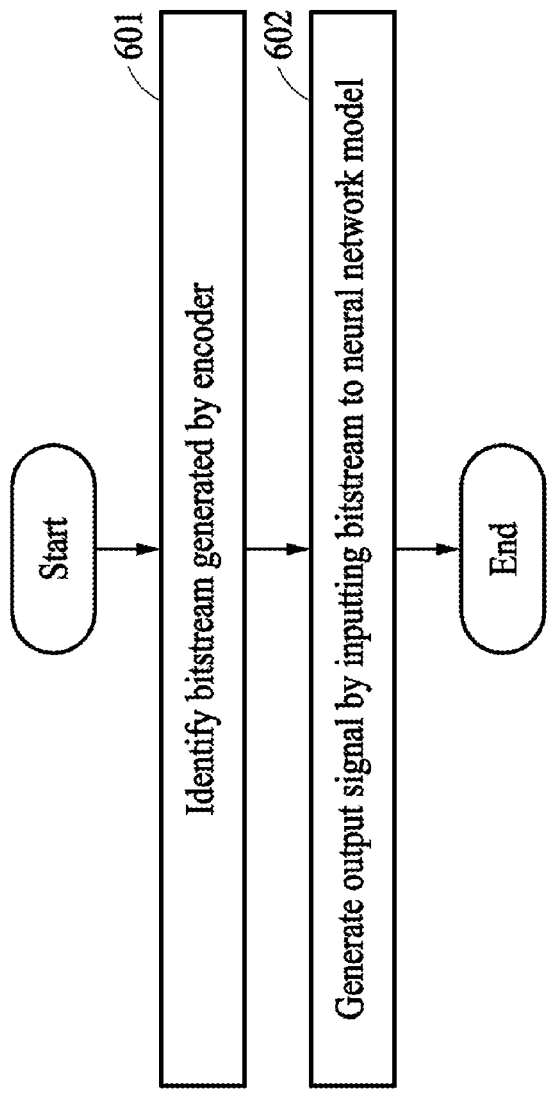
FIG. 6 is a flowchart illustrating a decoding method according to an example embodiment.

FIG. 6 is a flowchart illustrating a decoding method according to an example embodiment.

In operation 601, a decoder may identify a bitstream generated from an encoder. In operation 602, the decoder may generate an output signal by inputting the bitstream into a neural network model generating an output signal from a bitstream.

The neural network model may be a neural network model that is trained to generate an output signal from a bitstream. The neural network model may include a plurality of inverse-quantization blocks extracting quantized latent vectors having different resolutions from a bitstream, a plurality of upsampling blocks upsampling inversely-quantized latent vectors, and a restoration layer generating an output signal from upsampled latent vectors.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method of encoding an audio signal using a neural network model, the method comprising:
    identifying an input signal;
    generating a quantized latent vector by inputting the input signal into the neural network model encoding the input signal; and
    generating a bitstream corresponding to the quantized latent vector,
    wherein the neural network model comprises i) a feature extraction layer generating a latent vector by extracting a feature of the input signal, ii) a plurality of downsampling blocks producing a plurality of downsampled latent vectors corresponding to downsamplings of the latent vector respectively, and iii) a plurality of quantization blocks performing quantization of the plurality of downsampled latent vectors respectively, and
    wherein each of the plurality of quantization blocks comprises a conversion layer converting the respective downsampled latent vector to produce a respective converted latent vector, and a vector quantization layer performing vector quantization on the respective converted latent vector based on a codebook.

2. The method of claim 1, wherein the plurality of downsampled latent vectors respectively correspond to downsamplings of the quantized latent vector to different respective time resolutions.

3. The method of claim 1, wherein the vector quantization layer performs vector quantization of the converted latent vector by determining a code in the codebook in a nearest distance from the converted latent vector.

4. The method of claim 1, wherein a downsampling block of the plurality of downsampling blocks comprises a convolution layer performing a convolution operation and a maxpool layer processing a max-pooling operation on an operation result of the convolution layer.

5. The method of claim 4, wherein the downsampling block further comprises a residual block increasing non-linearity of an operation result of the maxpool layer, and the residual block comprises a convolution layer performing a convolution operation, a batch normalization layer performing batch normalization, and an activation layer.

6. A method of decoding an audio signal using a neural network model, the method comprising:
    identifying a bitstream generated by an encoder; and
    generating an output signal by inputting the bitstream into the neural network model generating an output signal from the bitstream,
    wherein the neural network model comprises a plurality of inverse-quantization blocks extracting respective inverse-quantized latent vectors having different respective time resolutions from the bitstream, a plurality of upsampling blocks upsampling the inversely-quantized latent vectors to produce upsampled latent vectors, respectively, and a restoration layer generating an output signal from the upsampled latent vectors.

7. The method of claim 6, wherein the plurality of upsampling blocks upsamples the inversely-quantized latent vectors in an ascending order of time resolutions, and a current upsampling block of the plurality of upsampling blocks upsamples a combination of i) a latent vector, among the inversely-quantized latent vectors, having a same time resolution as an upsampled latent vector produced by a previous upsampling block of the plurality of upsampling blocks and ii) the upsampled latent vector produced by the previous upsampling block.

8. The method of claim 6, wherein the inverse-quantization block comprises a residual block increasing non-linearity of the latent vector, and a convolution layer performing a convolution operation.

9. An encoder for performing a method of encoding an audio signal using a neural network model, the encoder comprising:
a processor configured to identify an input signal, generate a quantized latent vector by inputting the input signal to the neural network model encoding the input signal, and generate a bitstream corresponding to the quantized latent vector,
wherein the neural network model comprises i) a feature extraction layer generating a latent vector by extracting a feature of the input signal, ii) a plurality of downsampling blocks producing a plurality of downsampled latent vector corresponding to downsamplings of the latent vector respectively, and iii) a plurality of quantization blocks performing quantization of the plurality of downsampled latent vectors respectively, and
wherein each of the plurality of quantization blocks comprises a conversion layer converting the respective downsampled latent vector to produce a respective converted latent vector, and a vector quantization layer performing vector quantization on the respective converted latent vector based on a codebook.

10. The encoder of claim 9, wherein the plurality of downsampled latent vectors respectively correspond to downsamplings of the quantized latent vector to different respective time resolutions.

11. The encoder of claim 9, wherein the vector quantization layer performs vector quantization of the converted latent vector by determining a code in the codebook in a nearest distance from the converted latent vector.

12. The encoder of claim 9, wherein a downsampling block of the plurality of downsampling blocks comprises a convolution layer performing a convolution operation and a maxpool layer processing a max-pooling operation on an operation result of the convolution layer.

13. The encoder of claim 12, wherein the downsampling block further comprises a residual block increasing non-linearity of an operation result of the maxpool layer, and
the residual block comprises a convolution layer performing a convolution operation, a batch normalization layer performing batch normalization, and an activation layer.

* * * * *